T. FERRY.

DEVICE FOR UPSETTING SET SCREWS, CAP SCREWS, AND THE LIKE.

APPLICATION FILED DEC. 18, 1916.

Reissued Oct. 30, 1917. 14,384.

2 SHEETS—SHEET 1.

Inventor

Thomas Ferry

By

Obed B. Billman

Attorney

T. FERRY.

DEVICE FOR UPSETTING SET SCREWS, CAP SCREWS, AND THE LIKE.

APPLICATION FILED DEC. 18, 1916.

Reissued Oct. 30, 1917. 14,384.

2 SHEETS—SHEET 2.

Thomas Ferry Inventor

By Obed C. Billman Attorney

UNITED STATES PATENT OFFICE.

THOMAS FERRY, OF CLEVELAND, OHIO.

DEVICE FOR UPSETTING SET-SCREWS, CAP-SCREWS, AND THE LIKE.

14,384. Specification of Reissued Letters Patent. Reissued Oct. 30, 1917.

Original No. 1,146,145, dated July 13, 1915, Serial No. 498,347, filed May 25, 1909. Application for reissue filed December 18, 1916. Serial No. 137,727.

*To all whom it may concern:*

Be it known that I, THOMAS FERRY, a citizen of the United States, residing at Cleveland, in the county of Cuyahoga and State of Ohio, have invented certain new and useful Improvements in Devices for Upsetting Set-Screws, Cap-Screws, and the like; and I hereby declare the following to be a full, clear, and exact description of the invention, such as will enable others skilled in the art to which it pertains to make and use the same.

This invention relates to a device for upsetting or heading blanks for cap-screws, set-screws and the like.

With the devices heretofore employed only a limited portion or length of the blank or stock can be upset to form the head, or, in other words, the size of the head for a certain diameter of material is limited, for the reason that if it is attempted to upset a greater length of material, the punch or upsetting die on striking the end of the blank will cause the latter to buckle or bend resulting in a very imperfect or unsymmetrical head being formed. Consequently, if a head of a size larger than that which can be obtained by the usual upsetting devices is desired the bolt or screw must be machined out of larger stock than is desired for the shank, or the head must be welded to the shank.

The object of the present invention is to provide a device for upsetting or heading blanks for cap-screws, set-screws or the like by which a much greater length of material can be upset to form the head than is possible with the devices heretofore employed.

My invention therefore consists in providing a die for holding the blank which is to be headed so that one end of the blank projects beyond the face of the die, said die being provided with a cavity in which the head of the blank is formed, means for surrounding the projecting end of the blank, means for imparting a blow on the end of the blank while surrounded so as to partially upset the blank and means for imparting a second blow after the surrounding means has been removed to complete the upsetting of the blank, such mechanism being shown but not claimed in my Letters Patent No. 1,069,659, for process of upsetting set screws, cap screws, and the like, issued Aug. 5, 1913, on an application filed April 11, 1908.

My invention further consists in the features of construction and combination of parts as described in the specification, pointed out in the claims and illustrated in the accompanying drawings.

For a better understanding of my invention reference is had to the accompanying drawings in which—

Figure 1:
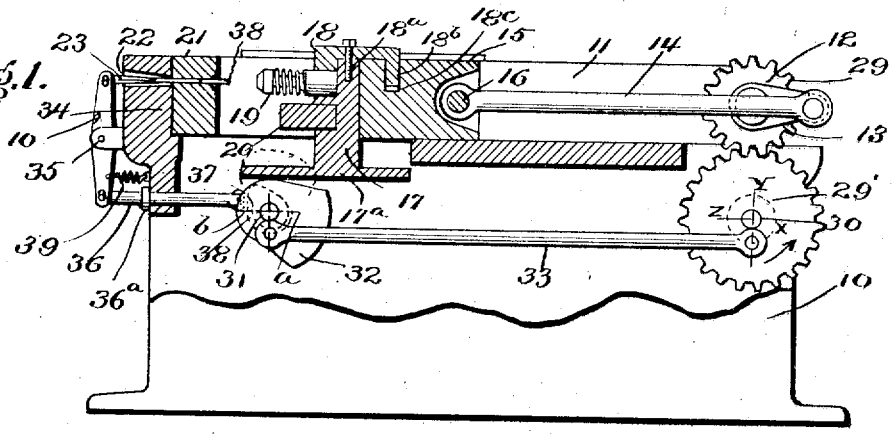
Figure 1, is a side elevation of an upsetting machine with parts thereof in section.

Referring now to the figures of the drawings 10, represents a part of the frame of the machine provided at the top with a guideway 11. Suitably mounted at one end of the frame is a main operating shaft 12, which is provided with a crank 13, to which is attached one end of a connecting rod or pitman 14. Mounted to slide in the guideway 11, and adapted to be reciprocated by the connecting rod is a cross head or slide 15, to which the opposite end of the rod 14, is connected at 16. At the end of the slide 15, is a die or punch holding block 17, which is adapted to be reciprocated by the slide 15, and also to move vertically with respect thereto as will be explained. The block 17, has an enlarged lower face $17^a$, which is adapted to be engaged by mechanism to be explained to shift the block vertically. Secured to the top of the block 17, is a guiding and holding member 18, provided with a portion $18^a$, which extends over the slide or cross head 15, and a portion $18^b$, at right angles to the portion $18^a$, and extending downward into an open slot $18^c$, in the top of the slide or cross head. The engaging faces of the members 15, 17, and 18, are carefully machined, so that although the block 17, is held against the end of the slide or cross head 15, by the portion 18[b], of the member 18, it may slide upward and downward across the end of the cross head. Secured to the block 17, are head forming members or punches designated 19, and 20, respectively, the member 20, being directly below the member 19. The member 19, as will be explained more fully partially accomplishes the upsetting at one stroke of the cross head and then the block 17, is raised presenting the punch 20, to the blank and at the second stroke this punch completes the upsetting process.

At the end of the frame is a die 21, which is provided with a passageway 21[a], adapted to receive the blank and at its outer face with a cavity 21[b], in which the head of the bolt or rivet is formed, the shape of the cavity being in this case such as to form a so-called square head. The passageway 21[a], is enlarged at 21[c], for a purpose which will hereinafter appear. The passageway 21[a], and cavity 21[b], are directly in line with the head forming member 19, when the block 17, is in its lowermost position. The end of the frame against which the die rests is provided with a passageway 22, in line with the passageway 21[a], and entering the passageway in the die is a pin 23, which forms a backing for the blank when the head is formed and kicks the blanks out of the die when the upsetting is completed. The mechanism for accomplishing the latter will be explained later.

The upsetting member 19, is provided with a sleeve or tubular member 24, which is fixed at one end in the block 17, and is provided on the exterior near the outer end with a reduced portion 24[a], forming a shoulder 24[b]. The interior of the tubular member 24, is of two diameters the inner end being larger than the outer forming on the interior a shoulder 24[c]. Slidably mounted on the interior of the sleeve 24, and fitting closely therein is a plunger 25, provided with a bore 26, which is adapted to receive the end of the blank during the first step of the upsetting process so that the plunger 25, surrounds the end of the blank. The plunger 25, has at its inner end a nut or ring 25[a], which is adapted to engage the inner shoulder 24[c], so as to limit the outer movement of the plunger, and at its opposite end an outer enlarged portion forming a second shoulder 25[c]. The plunger is normally held in its outer position by means of a coil spring 27, which surrounds the outer end of the holding sleeve and the adjacent portion of the plunger and bears against the shoulder 24[b], and the shoulder 25[c]. In the bore 26, of the plunger 24, is arranged a punch 28, which is preferably so arranged as to slide freely therein, but its outward movement is limited by a head 28[a], on its inner end adapted to engage the inner end of the plunger. The punch 28, is shorter than the plunger 25, so that when the spring 27, is compressed and the plunger 25, is in its innermost position the end of the plunger will engage the block 17, at the same time the shoulder 25[b], engages the outer end of the holding sleeve 24. The punch or upsetting member 20, is simply a hardened steel block having a flat outer face and rigidly mounted on the block 17.

The mechanism for raising the block or punch holding member 17, after the first stroke or after the upsetting is partially completed by the member 19, and the mechanism for kicking the headed bolt or rivet out of the die after the heading or upsetting is completed will now be described. Mounted upon the main shaft 12, is a gear wheel 29, which meshes with a second gear wheel 29′ mounted upon a shaft 30, which is below the main shaft 12. Mounted upon a shaft 31, near the opposite end of the mechanism and below the block 17, is a cam 32, which is adapted to engage the lower face of the block 17, so as to raise the latter at the proper time to present the punch 20, to the blank. The cam 32, is connected in this case to the gear wheel 29′ by means of a connecting rod 33, so that when the gear 29′ is turned through a quarter revolution in the direction indicated by the arrow the wrist pin thereof will travel to the point *x* and the wrist pin of the cam 32, will travel to *a*. The working end of the cam 32, will swing up thereby shoving up the member 17, which brings the punch 20, in position to operate on the blank. When the gear 29′ completes the next quarter revolution the wrist pin thereof travels to *y* and the wrist pin of the cam 32, will travel back to its original position, and the cam 32, will be rocked back and down to its original position permitting the member 17, to move back to its lower position. When the gear 29′, is turned through the third quarter revolution the wrist pin thereof reaches the point *z* and the wrist pin of the cam 32, will be at *b* and when the gear 29′ is turned through the fourth quarter revolution the wrist pin thereof is back to its original position and the wrist pin of the cam 32, will be again in its original position so that during the last half revolution of the gear 29′ the cam 32, will move idle. The gear wheel 29′ is preferably twice the size of the gear wheel 29, so that the former will make one revolution while the gear wheel 29, will make two revolutions.

In order that the blank may be kicked out of the die when the heading or upsetting is completed I connect the pin 23, which extends into the passageway or bore of the die from the rear, to the end of a lever 34, which is pivoted intermediate its ends on the frame of the machine at 35, and is connected at its opposite end to a plunger 36, which is slidably mounted in the frame of the machine and carries at its inner end a roller 37, which engages a cam 38, (shown by dotted lines in Fig. 1) mounted on the shaft 31. The lower end of the lever 34, and the plunger 36, are held in their innermost positions by means of a spring 39, the inward movement being limited by a flange 36[a], on the plunger 36. When the parts are in this position the pin 23, is held in its outermost position or in the position to form a backing for the blank. The cam 38, is so formed that it will engage the roller so as to force the plunger outward and the pin inward after the second stroke of the slide or cross head 15, and after the punch 20, has completed the upsetting.

Figure 2:
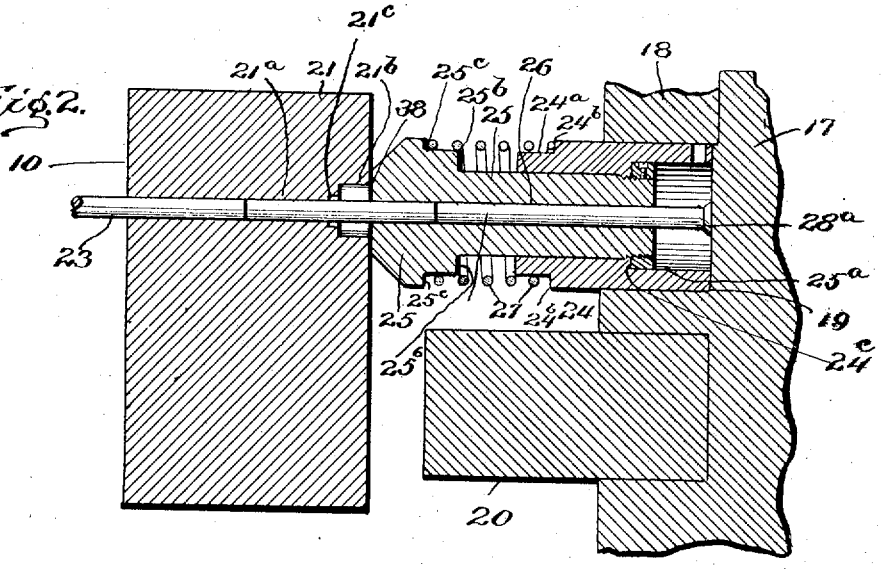
Fig. 2, is an enlarged detail in section showing the dies in position for performing the first step of the upsetting or heading process.
Figure 3:
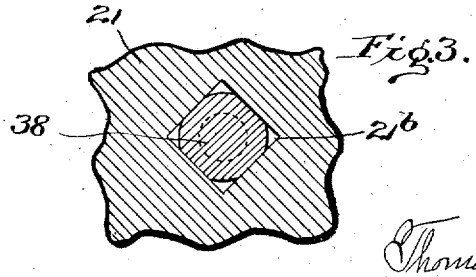
Fig. 3, is a section on line 3—3, Fig. 4.
Figure 4:
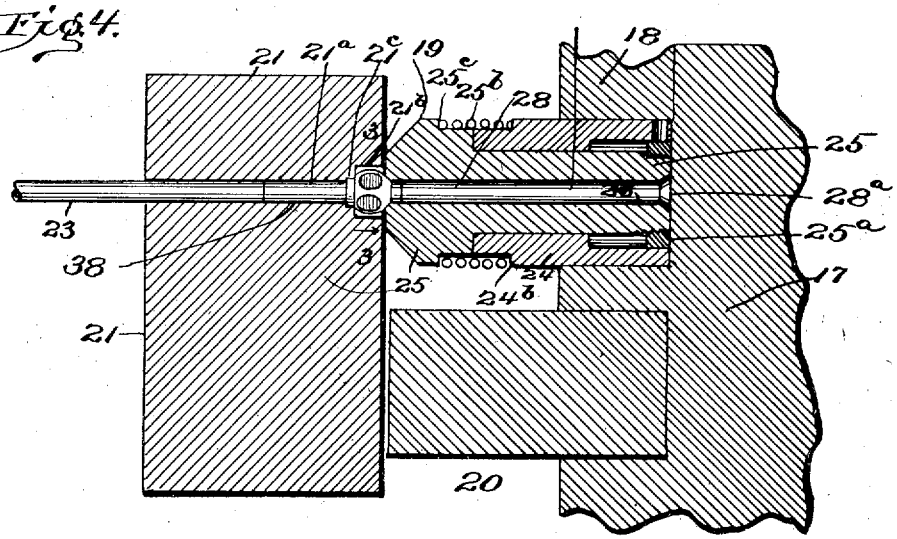
Fig. 4, is a view similar to Fig. 2, showing the parts in position when the first step in the upsetting process has been performed and showing the blank or stock partially upset.
Figure 5:
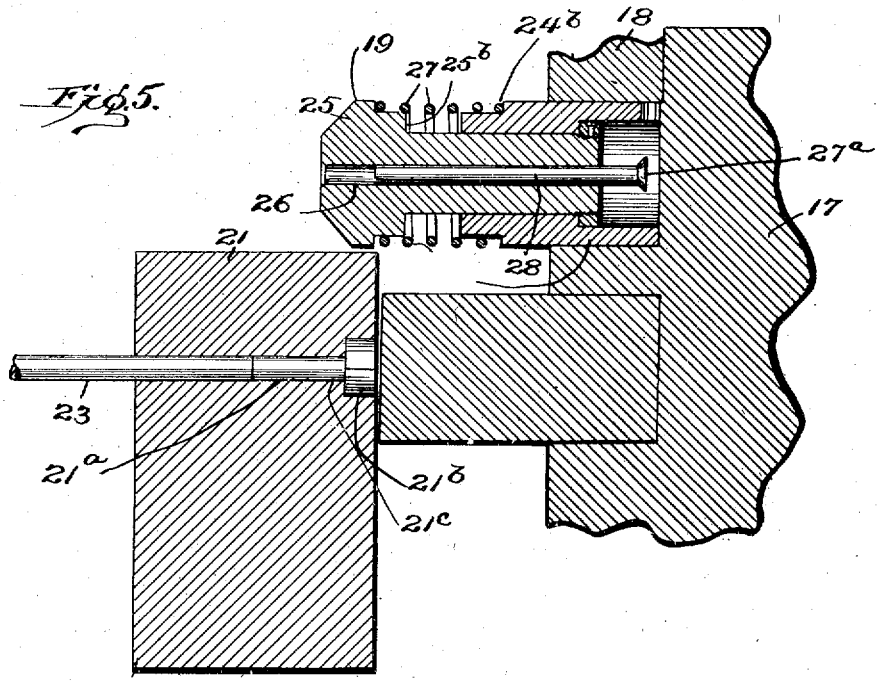
Fig. 5, is a sectional view similar to Figs. 2, and 4, showing the parts in position when the process of upsetting is completed and showing the blank or stock with the upsetting completed.

The operation of the machine will now be described more fully. When the blank which is shown in Fig. 2, is placed in the die and before the beginning of the stroke which forms the first part of the upsetting, the parts are in the position shown in Fig. 1, the heading member 20, being in line with the blank. As the slide 15, moves forward and the plunger 24, approaches the die, the end of the blank which projects beyond the plunger 24, approaches the die, the end of the blank which projects beyond the die enters the passageway in the end of the plunger 25, the passageway being just large enough to permit the end of the blank to pass freely therein. As the slide and the parts carried thereby continue toward the die, the end of the plunger engages the face of the die and the end of the punch 25[b], engages the outer end of the blank, the parts then being in the position shown in Fig. 2. Further movement of the parts causes the plunger to slide inward relative to the sleeve against the tension of the spring, and as the inner end of the punch is in engagement with the block 17, the metal of the blank is compressed, but as the outer end of the blank is surrounded by the end of the plunger this part cannot be upset, and as the metal will expand along the lines of least resistance, the force of the blow causes the metal intermediate the ends of the blank to expand outwardly and partially fill the cavity in the die. The position of the parts at this stage of the upsetting process is shown in Fig. 4, and the shape of the head so far formed is shown in Fig. 3. The heading member 20, is then drawn away from the die 21, by the return stroke of the slide or cross head. During the second stroke of the latter the block 17, is shifted by the cam 32, and at the completion of the second stroke the punch 20, strikes the end of the blank and completes the upsetting, completely filling the head cavity 21[b], and the enlargement 21[c], of the passageway 21[a]. At the completion of the second stroke the parts are in the position shown in Fig. 5. During the return movement of the cross head or slide after the second stroke the blank is kicked out of the die by the inward movement of the pin 23, caused by the cam 38, engaging the roller on the end of the plunger 36, and shifting the lever 34. When the headed blank is knocked out of the die it will have the usual flash around the head which is trimmed off and the shank is then threaded preferably by rolling a thread thereon.

What I claim is,—

1. In an upsetting machine, a stationary blank holding die having a head forming cavity on its face side and provided with means for holding the blank so that one end thereof projects a sufficient distance to completely fill said head forming cavity when completely upset therein, means for initially surrounding the projecting end of said blank, means for imparting a blow on the end of said blank while so surrounded whereby to partially upset the unsurrounded portion of said blank within said head forming cavity, and means for imparting a second blow after said surrounding means has been removed to complete the upsetting of same.

2. In an upsetting machine, a die having a matrix of the size and shape of the completed head to be formed, means for holding and supporting the blank in said die whereby one end thereof projects beyond said matrix, means movable toward said die for inclosing the projecting end of said blank and simultaneously applying pressure thereto whereby to crowd and expand the intermediate portion of said blank into said matrix while maintaining the projecting end surrounded portion of the same shape and cross section as the original blank, and means for imparting pressure to said formerly surrounded end and completely upsetting the same to fill said matrix.

3. In an upsetting machine, a stationary blank holding die provided with a head forming cavity and having means for holding the blank so that one end thereof projects a sufficient distance to fill said cavity when completely upset, movable means for initially inclosing and preventing the upsetting of the extreme projecting end of said blank when pressure is applied thereto, means for applying pressure on the end of said blank while so surrounded and expanding a portion of said blank into said head forming cavity, and independent means for finally upsetting the projecting end together with said expanded portion into said head forming cavity to completely fill the same.

4. In an upsetting machine, the combination with a stationary die provided with a blank receiving opening terminating in an enlarged head forming cavity on the face side thereof, means for holding said blank so that one end thereof projects a predetermined distance in front of said head forming cavity, means for initially surrounding and preventing the upsetting of said projecting end of said blank, means for imparting a blow on the projecting end of said blank while so surrounded whereby to upset the unsurrounded portion of said blank within said head forming cavity, and means for imparting a second blow to the formerly surrounded end of said blank whereby the latter is driven into and finally upset to completely fill said head forming cavity.

5. In an upsetting machine of the character described, a stationary die provided with a blank receiving opening terminating in a head forming cavity at the face side thereof, means for holding the blank so that one end thereof projects in front of said head forming cavity, a carriage provided with means for surrounding and preventing the upsetting of said projecting end while pressure is applied to the latter, a plunger in said surrounding means and operated by said carriage for imparting a blow on said surrounded projected end of said blank whereby to upset the unsurrounded or intermediate portion of said blank within said head forming cavity, and separate means on said carriage for imparting a second blow to the remaining or formerly surrounded end of said blank whereby the latter is driven in and finally upset to completely fill said head forming cavity.

6. In a machine for upsetting or heading blanks for cap-screws, and the like, the combination with a stationary die provided with an opening for the reception of a blank, said opening terminating at the face of said die in a head forming cavity, means for holding the blank so that one end thereof projects beyond the face of said die, a carriage movable toward and away from said die, means on said carriage for surrounding and preventing the upsetting of the projecting end of said die, means for imparting a blow on the surrounded end of the blank whereby the intermediate portion of the latter is partially upset in said head forming cavity while said projecting end is so surrounded, and means on said carriage for imparting a second blow after said surrounding means have been removed whereby said formerly surrounded end is upset to completely fill said head forming cavity.

7. In an upsetting machine of the character described, a die provided with a blank receiving opening terminating in a head forming cavity on the face side thereof, means for supporting the blank therein so that one end thereof projects a predetermined distance in front of said head forming cavity an upsetting device comprising a movable member provided with a second blank receiving opening of like shape and cross section to initially surround and prevent the upsetting of the projecting end of said blank while pressure is applied to the end thereof, a plunger in said movable member for imparting a blow on the end of said blank while said movable member surrounds and partially uncovers the same while the unsurrounded or intermediate portion of said blank is being expanded within said head forming cavity, means for removing said surrounding and plunger members from the remaining end of said projecting end, and means for then imparting pressure to said formerly surrounded end of said blank and finally upsetting the latter to completely fill said head forming cavity.

8. In an upsetting machine of the character described, a stationary die provided with a blank receiving opening terminating at its face side in a head forming cavity, means for holding said blank in said opening whereby a sufficient amount of stock projects in front of said die to fill said cavity when completely upset in the latter, a movable die provided with a second blank receiving opening of like diameter to said first mentioned opening adapted to initially surround and prevent the upsetting of the projecting end of said blank, means for imparting pressure to and moving said projecting end inwardly while the latter is surrounded by said surrounding means whereby the unsurrounded portion of said blank is upset within said head forming cavity, means for removing said surrounding means after the completion of said first mentioned pressure supplying impulse, and independent means for applying pressure to the formerly surrounded end of said blank whereby the latter together with the formerly expanded portion are finally upset and expanded to completely fill said head forming cavity.

9. In an upsetting machine for heading blanks for cap-screws, and the like, a stationary die provided with a blank receiving opening terminating in an enlarged head forming cavity at the face side thereof, means for holding said blank in said opening whereby one end thereof projects a sufficient distance to fill said head forming cavity when completely upset, means for surrounding and preventing the upsetting of the projecting end of said blank while the intermediate portion of the latter is being initially expanded in said head forming cavity by pressure applied to and moving the end of said blank independently of and relatively to said surrounding means, means for applying pressure on and moving the surrounded projecting end of said blank to expand the latter intermediate its ends into said head forming cavity, means for removing said surrounding and pressure applying means from said projecting end after said initial expansion of the intermediate portion of said blank, and means for upsetting the said formerly surrounded projecting end and said initially expanded intermediate portion thereof into said head forming cavity to completely fill the latter and form the completed head.

10. In an upsetting machine, the combination with a stationary die provided with an opening for the reception of a blank, said opening terminating at the face of the die in a head forming cavity, a carriage movable toward and away from said die and means for actuating said carriage, of an upsetting device mounted on said carriage, said device comprising an outer tubular member, an inner member arranged in said outer member and free to slide and provided with a bore arranged to register with the blank receiving opening in the die block and of the same diameter as the blank receiving opening, a plunger slidably arranged in the bore in said inner member and movable relative to said member, an abutment arranged at the rear of said outer member to have positive contact with the rear end of the plunger during the forward movement of the carriage and with the rear end of the inner member near the completion of the forward movement of the carriage and force said plunger against the blank which is being operated on, while said inner member is surrounding and is being moved rearwardly relatively to said blank and plunger, and means for imparting pressure to the formerly surrounded projecting end of the blank to completely upset the latter in said head forming cavity.

In testimony whereof I have affixed my signature in the presence of two witnesses.

THOMAS FERRY.

Witnesses:

H. D. North,

G. M. Bates.

Copies of this patent may be obtained for five cents each, by addressing the "Commissioner of Patents, Washington, D. C."